United States Patent
Rahman et al.

(10) Patent No.: US 9,820,295 B2
(45) Date of Patent: Nov. 14, 2017

(54) OVER-THE AIR SIGNALING FOR COORDINATION OF TIME-DIVISION DUPLEXING

(71) Applicant: Telefonaktiebolaget L M Ericsson (publ), Stockholm (SE)

(72) Inventors: Muhammad Imadur Rahman, Sollentuna (SE); David Astely, Bromma (SE); Erik Eriksson, Linköping (SE); Daniel Larsson, Vallentuna (SE); Eliane Semaan, Vällingby (SE); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

(21) Appl. No.: 14/759,951

(22) PCT Filed: May 21, 2013

(86) PCT No.: PCT/SE2013/050576
§ 371 (c)(1),
(2) Date: Jul. 9, 2015

(87) PCT Pub. No.: WO2014/109683
PCT Pub. Date: Jul. 17, 2014

(65) Prior Publication Data
US 2015/0351117 A1    Dec. 3, 2015

Related U.S. Application Data

(60) Provisional application No. 61/750,968, filed on Jan. 10, 2013.

(51) Int. Cl.
*G01R 31/08* (2006.01)
*H04W 72/12* (2009.01)
(Continued)

(52) U.S. Cl.
CPC ...... *H04W 72/1231* (2013.01); *H04B 7/0626* (2013.01); *H04L 5/0092* (2013.01);
(Continued)

(58) Field of Classification Search
CPC ......... H04W 72/1231; H04W 72/1289; H04W 72/0426; H04W 88/08; H04W 52/242;
(Continued)

(56) References Cited

U.S. PATENT DOCUMENTS

| | | | |
|---|---|---|---|
| 7,023,826 B2* | 4/2006 | Sjoberg | H04L 5/023 370/338 |
| 8,712,418 B2* | 4/2014 | Morioka | H04B 7/024 455/445 |

(Continued)

FOREIGN PATENT DOCUMENTS

| | | | |
|---|---|---|---|
| EP | 647080 | * | 4/1995 |
| WO | 2011077288 A2 | | 6/2011 |

(Continued)

OTHER PUBLICATIONS

3GPP, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)", 3GPP TR 36.828 V11.0.0, Jun. 2012, 1-109.

(Continued)

*Primary Examiner* — Robert Wilson
(74) *Attorney, Agent, or Firm* — Murphy, Bilak & Homiller, PLLC

(57) ABSTRACT

Coordination information for controlling base-station-to-base-station interference is transmitted from one radio network node (900) (e.g., an LTE eNodeB) to another, using certain parts of the TDD subframe. One example method, as might be implemented in a radio network node (900) such as an LTE eNodeB, includes the generating (1010) of a TDD (Continued)

coordination signal and the transmitting (1020) of the TDD coordination signal to one or more other radio network nodes. In some embodiments, the coordination signal is transmitted in a guard period of a special subframe at the target node. In others, the coordination signal is transmitted in another interval during which the receiving node is not transmitting, such as in uplink subframe for the receiving node, an uplink portion of a special subframe at the receiving node, or in a downlink subframe or downlink portion of a special subframe during which the receiving node is not transmitting.

15 Claims, 9 Drawing Sheets

(51) Int. Cl.
| | | |
|---|---|---|
| H04B 7/06 | (2006.01) | |
| H04L 5/14 | (2006.01) | |
| H04W 72/04 | (2009.01) | |
| H04W 88/08 | (2009.01) | |
| H04W 16/10 | (2009.01) | |
| H04W 52/24 | (2009.01) | |
| H04L 5/00 | (2006.01) | |

(52) U.S. Cl.
CPC .............. *H04L 5/14* (2013.01); *H04L 5/1438* (2013.01); *H04L 5/1469* (2013.01); *H04W 72/0426* (2013.01); *H04W 72/1289* (2013.01); *H04L 5/0007* (2013.01); *H04L 5/0048* (2013.01); *H04L 5/0085* (2013.01); *H04W 16/10* (2013.01); *H04W 52/242* (2013.01); *H04W 52/244* (2013.01); *H04W 72/0446* (2013.01); *H04W 88/08* (2013.01)

(58) Field of Classification Search
CPC ...... H04W 16/10; H04L 51/14; H04L 5/1438; H04L 5/0092; H04L 5/1469; H04L 5/0007; H04L 5/0048; H04L 5/0085; H04B 7/0626
See application file for complete search history.

(56) References Cited

U.S. PATENT DOCUMENTS

| | | | | |
|---|---|---|---|---|
| 2005/0136960 A1* | 6/2005 | Timus | ................. | H04W 52/343 455/522 |
| 2006/0189323 A1* | 8/2006 | Usuda | ................... | H04W 28/22 455/453 |
| 2007/0206561 A1* | 9/2007 | Son | ..................... | H04W 72/042 370/346 |
| 2009/0046605 A1* | 2/2009 | Gao | ....................... | H04W 72/14 370/280 |
| 2011/0237273 A1* | 9/2011 | Wigren | ................ | H04B 17/345 455/452.2 |
| 2011/0244908 A1* | 10/2011 | Morioka | ................ | H04B 7/024 455/509 |
| 2012/0147773 A1* | 6/2012 | Kim | ...................... | H04L 1/0025 370/252 |
| 2012/0281646 A1* | 11/2012 | Liao | ...................... | H04L 5/0094 370/329 |
| 2013/0331110 A1* | 12/2013 | Jia | ........................ | H04W 28/06 455/450 |
| 2014/0126432 A1* | 5/2014 | Wang | ................... | H04B 7/2656 370/280 |
| 2015/0117362 A1* | 4/2015 | Luo | ....................... | H04W 24/02 370/329 |
| 2017/0055291 A1* | 2/2017 | Gorokhov | ......... | H04W 72/1215 |

FOREIGN PATENT DOCUMENTS

| | | | |
|---|---|---|---|
| WO | 2011088465 | A1 | 7/2011 |
| WO | 2012159853 | A1 | 11/2012 |
| WO | WO 2014/109683 | * | 7/2014 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0, Dec. 2012, 1-108.

3GPP, "3rd Generation Partnership Project; Technical Specification Group Radio Access Network; Further Enhancements to LTE TDD for DL-UL Interference Management and Traffic Adaptation; (Release 11)", 3GPP TR 36.828 V2.0.0, Jun. 2012, 1-109.

Shen, Zukang et al., "Dynamic Uplink-Downlink Configuration and Interference Management in TD-LTE." Technology Updates on LTE Advanced, IEEE Communications Magazine, Nov. 2012, 51-59.

Unknown, Author, "Relay frame structure design of TDD mode", 3GPP TSG RAN WG1 Meeting #56bis, R1-091270, Huawei, Seoul, Korea, Mar. 23-27, 2009, 1-10.

* cited by examiner

TABLE 1: UPLINK-DOWNLINK CONFIGURATIONS

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

*FIG. 1*

TABLE 2: CONFIGURATION OF SPECIAL SUBFRAME
(LENGTHS OF DwPTS/GP/UpPTS)

| SPECIAL SUBFRAME CONFIGURATION | NORMAL CYCLIC PREFIX IN DOWNLINK | | | EXTENDED CYCLIC PREFIX IN DOWNLINK | | |
|---|---|---|---|---|---|---|
| | DwPTS | UpPTS | | DwPTS | UpPTS | |
| | | NORMAL CYCLIC PREFIX IN UPLINK | EXTENDED CYCLIC PREFIX IN UPLINK | | NORMAL CYCLIC PREFIX IN UPLINK | EXTENDED CYCLIC PREFIX IN UPLINK |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | --- | --- | --- |
| 8 | $24144 \cdot T_s$ | | | --- | --- | --- |

FIG. 2

DL, UL AND FLEXIBLE SUBFRAMES.

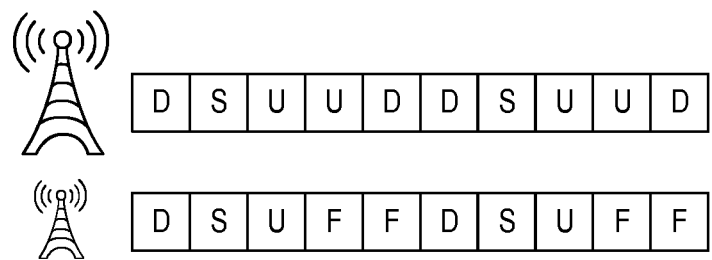
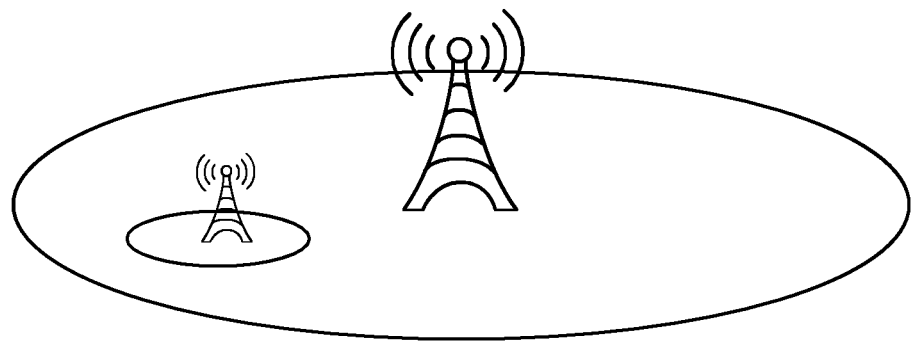
FIG. 6
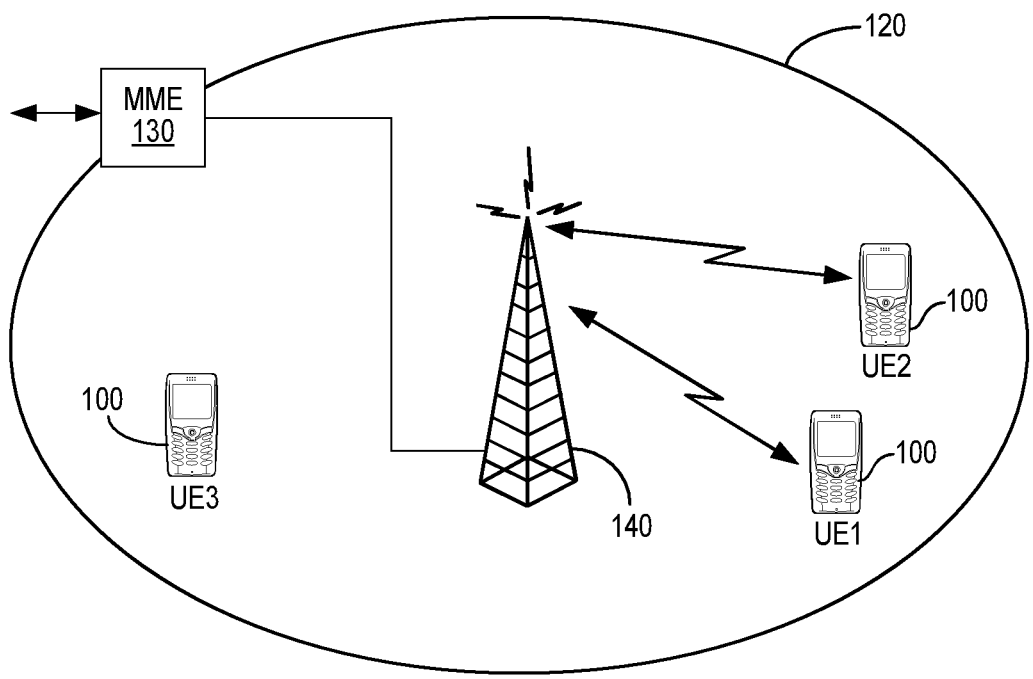
FIG. 7

OVER-THE AIR SIGNALING FOR COORDINATION OF TIME-DIVISION DUPLEXING

BACKGROUND

In communication networks based on the Long Term Evolution (LTE) specifications promulgated by the Third Generation Partnership Project (3GPP), two radio frame structures are supported. A "type 1" structure is applicable to Frequency Division Duplexing (FDD) system configurations, where downlink (base station-to-user equipment) transmissions and uplink (user equipment-to-base station) transmissions take place in separated frequency bands. A "type 2" structure is applicable to Time Division Duplexing (TDD) system configurations, where downlink and uplink transmissions take place in different, non-overlapping time slots. In both frame structure types, each 10-millisecond radio frame is divided into two 5-millisecond half-frames, and each half-frame includes five 1-millisecond subframes.

Further, in frame structure type 2, each subframe is either a downlink subframe, an uplink subframe, or a special subframe. The various combinations of these subframe types in a frame give rise to different TDD configurations. The permitted configurations are depicted in Table 1, shown in FIG. 1. These configurations are defined in Table 4.2-2 of the 3GPP Technical Specification "Evolved Universal Terrestrial Radio Access (E-UTRA); Physical Channels and Modulation," 3GPP TS 36.211, v. 11.1.0 (December 2012), available at http://www.3gpp.org.

The supported uplink-downlink configurations in LTE TDD are listed in FIG. 1 where, for each subframe in a radio frame, "D" denotes a subframe that is reserved exclusively for downlink transmissions, "U" denotes a subframe that is reserved exclusively for uplink transmissions and "S" denotes a special subframe with the three fields: DwPTS ("downlink pilot time slot"), GP ("guard period"), and UpPTS ("uplink pilot time slot"). The guard time provided by the GP field is an important aspect of any TDD system, as it is required to avoid interference between uplink and downlink transmissions that might arise from propagation delays. The guard time also provides time for the equipment at each end of the link to switch between receive and transmit operations. The DwPTS and UpPTS parts of the special subframe are allocated to the downlink and the uplink, respectively. Depending on the configuration, the UpPTS is long enough to permit one or two OFDM symbols to be transmitted in the uplink, while the DwPTS can be long enough to permit as many as twelve symbols to be transmitted in the downlink. The length of DwPTS and UpPTS is given by Table 2, shown in FIG. 2, where $T_s$ is the length of the fundamental period of the OFDM modulation and is equal to $1/(15000 \times 2048)$ seconds. The length of GP can be determined from Table 2, subject to the total length of DwPTS, GP and UpPTS being equal to 1 millisecond. Each subframe consists of two slots, each of length 0.5 ms.

As seen in FIG. 1, each uplink-downlink configuration has either a 5-millisecond or 10-millisecond periodicity with respect to the downlink-to-uplink switch points. In configurations having a 5-millisecond downlink-to-uplink switch-point periodicity, the special subframe exists in both half-frames. In configurations having a 10-millisecond downlink-to-uplink switch-point periodicity, the special subframe exists only in the first half-frame. In all configurations, subframes 0 and 5 and the DwPTS portion of the special subframe are always reserved for downlink transmission. The UpPTS portion of the subframe and the subframe immediately following the special subframe are always reserved for uplink transmission.

In a TDD cell within a wireless communication network, a TDD configuration is characterized by both the uplink-downlink configuration and the special subframe configuration. Therefore the term "TDD configuration" used hereinafter refers to a combination of an uplink-downlink configuration configured in a TDD cell, e.g. one of the configurations depicted in Table 1, shown in FIG. 1, along with a special subframe configuration, e.g., one of the configurations depicted in Table 2, shown in FIG. 2. Of course, it will be understood that these are example configurations and that additional TDD configurations may be introduced in the future; thus, the teachings herein are not limited to these example configurations.

Dynamic TDD, e.g., dynamically changing TDD configurations, may be used to better adapt to changing network deployments and usage. For example, it is envisioned that there will be more and more localized traffic in the future, where most network users will be in hotspots, or in indoor areas, or in residential areas. The locations of these users will thus tend to be clustered and the aggregations of these users will tend to have different uplink and downlink traffic needs at different times. This circumstance essentially means that a dynamic feature to adjust allocations of uplink and downlink resources to instantaneous (or near instantaneous) traffic variations may be required in future local-area cells.

TDD is especially adapted to handle these varying traffic requirements, because the usable bandwidth can be configured in different time slots for use by either the uplink or the downlink. This approach allows for asymmetric allocations of uplink/downlink resources, which is a TDD-specific property, and not possible in FDD. As can be seen in FIG. 1, there are seven different uplink/downlink allocations in LTE, such that between 40%-90% of a given subframe's resources are allocated to the downlink. This can be more clearly seen in FIG. 3, which illustrates the allocation of uplink/downlink resources in each of the allowed TDD configurations. The configurations cover a wide range of allocations, from uplink-heavy, with a downlink-to-uplink ratio of 2:3 (Configuration 0) to downlink-heavy, with a downlink-to-uplink ratio of 9:1 (Configuration 5).

To avoid severe interference between downlink and uplink transmissions between different cells, neighbor cells in currently deployed LTE systems are typically configured with the same downlink/uplink configuration. If this is not done, uplink transmission in one cell can interfere with downlink transmission in the neighboring cell (and vice versa), as shown in FIG. 4. Hence, the downlink/uplink asymmetry in these systems is typically not varied between cells, but is signaled as part of the system information and remains the same for a long period of time In these current networks, uplink/downlink configuration is semi-statically configured, which means that it may not match the instantaneous traffic situation. This mismatch results in inefficient resource utilization in both the uplink and downlink, especially in cells with a small number of users. Dynamic TDD addresses this issue by allowing a dynamic configuration of the TDD uplink/downlink asymmetry, to better match the current traffic situation and thereby optimize or at least improve the user experience. The dynamic TDD approach also can be utilized to reduce network energy consumption. Dynamic TDD is generally described in the 3GPP technical report "Further Enhancements to LTE Time Division Duplex (TDD) for Downlink- Uplink (DL-UL) interference management and traffic adaptation," 3GPP TR 36.828, v2.0.0 (June 2012), available at http://www.3gpp.org.

Thus, the typical use of fixed TDD configurations in existing TDD networks, which semi-statically determines which subframes are uplink subframes and which subframes are downlink subframes, should be understood as limiting the ability to address changing uplink/downlink asymmetry arising from varying traffic situations. One approach to increasing TDD configuration flexibility, at least in some scenarios, is based on the idea that each subframe (or part of a subframe) belongs to one of three different types, downlink subframes, uplink subframes, or "flexible" subframes.

Downlink subframes or downlink subframe portions (i.e., DwPTS), are used (among other things) for transmission of downlink data, system information, control signaling, and hybrid-ARQ feedback in response to uplink transmission activity. This type of subframe is currently specified, i.e., per Release 8 of the specifications for LTE. During reception of a downlink subframe, a mobile terminal (a "user equipment," or "UE," in 3GPP terminology) monitors the Physical Downlink Control Channel (PDCCH) as specified in the LTE Release 8 standards, whereby it may receive scheduling assignments and scheduling grants. Special subframes are similar to downlink subframes except that, in addition to the downlink part (DwPTS), they also include a guard period (GP) as well as an uplink part (UpPTS) in the end of the subframe.

Uplink subframes are used (among other things) for transmission of uplink data, uplink control signaling (channel-status reports), and hybrid-ARQ feedback in response to downlink data transmission activity. This type of subframe is currently specified, i.e., per Release 8 of the specifications for LTE. Because the UpPTS is only one or two OFDM symbols in length, UpPTS usage is limited to either sounding reference signals or random access (RACH) transmission. Data transmission by a UE on the Physical Uplink Shared Channel (PUSCH) in uplink subframes or the UpPTS portion of a special subframe is controlled by uplink scheduling grants received on a PDCCH in an earlier subframe.

Flexible subframes, which are not specified in the LTE Release 8 standards, can be used for uplink or downlink transmissions, as determined dynamically by scheduling assignments/grants.

Semi-static configuration is used to assign one of the above four types (DL, UL, special, or FLEX) to each subframe. One example frame configuration under this approach is illustrated in FIG. 5, which shows a frame having flexible subframes (designated by "FLEX") in the fourth, fifth, ninth, and tenth of the ten subframes. The semi-static configuration of subframe types may be accomplished by way of a Medium Access Control (MAC) Control Element or CE, or using Radio Resource Control (RRC) signaling, or by using a specific Radio Network Temporary Identifier (RNTI) on the PDCCH. Configuration information could be part of the system information as in Release 8 of the LTE standards, for example. The system information could explicitly indicate "UL", "DL", or "FLEX" for each subframe, for example. (The special subframe positions are implicitly indicated by the configuration of downlink and uplink subframes.) Alternatively, a configuration could be signaled by signaling "DL" and "UL" allocations for all of the subframes, using the conventional Release 8 signaling message, and then using an additional signaling message, understandable by new terminals only, that indicates that some uplink subframes should be configured as flexible subframes.

From the perspective of the UE, flexible subframes are treated in a similar way as downlink subframes, unless the UE has been instructed to transmit in a particular flexible subframe. Expressed differently, flexible subframes not specifically assigned for uplink transmission from a particular UE are, from a PDCCH perspective, treated as a downlink subframe. Hence, the UE generally monitors several candidate PDCCHs in a flexible subframe. If the control signaling indicates that the UE is supposed to receive downlink data transmission on the Physical Downlink Shared Channel (PDSCH), the UE will receive and process the PDSCH, just as it would for a downlink subframe. Similarly, if the control signaling contains an uplink scheduling grant valid for a later flexible subframe, the UE will transmit in the uplink accordingly.

In discussions and document of the dynamic TDD techniques summarized above, the terms dynamic TDD, flexible TDD, flexible UL/DL allocation, adaptive TDD, reconfigurable TDD, etc., may be interchangeably used. These terms all refer to the same concept. With dynamic TDD, one or more "dynamic" or "flexible" subframes can be used in different directions of transmission (i.e., uplink versus downlink) in different cells, which may belong to the same carrier or different carriers. Furthermore, the direction of flexible subframes in a particular cell can be changed over time, e.g., as fast as every radio frame. The controlling radio network node can decide whether and when to change the direction of a flexible subframe independently, or depending upon the TDD configuration used in one or more neighboring TDD cells. In principle, any subframe that is not adjacent to a special subframe can be configured as a flexible subframe. For example, in TDD configuration 0 (see FIG. 1), any of the subframes 3, 4, 8 and 9 can be configured as a flexible subframe.

An example of different TDD configurations across different cells is shown in FIG. 6. In the illustrated example, TDD Configuration 1 is used in the macro cell, as represented by the larger cell tower symbol, which may correspond to a macro LTE base station, known as an evolved Node B, or eNodeB. A flexible TDD configuration is used in the pico layer, as represented by the smaller cell tower symbol, which may correspond to a pico eNodeB. Note that the flexible subframes are indicated with an "F" in FIG. 6. It should be appreciated that base station-to-base station (BS-to-BS) interference can occur in certain subframes, depending on how the flexible subframes are used. This can have a serious impact on the uplink throughput in the victim cell, i.e., the cell that is trying to receive an uplink transmission from a UE while the neighboring cell is transmitting. Accordingly, while dynamic TDD has great potential for adaptively shifting uplink and downlink resources in response to traffic demands, further improvements are needed to ensure that excessive interference does not occur.

SUMMARY

Current systems and solutions for scheduling and assignment of resources in TDD systems do not adequately take into account the potential for base-station-to-base-station (BS-to-BS) interference in scenarios where asymmetric or dynamic subframes are used. According to one aspect of the teachings herein, coordination information for controlling BS-to-BS interference is transmitted from one radio network node (e.g., an LTE eNodeB) to another, using certain parts of a TDD subframe. Various contents and structures of the coordination information signal are also disclosed, as are ways for multiple radio network nodes to transmit and/or to use the coordination signals.

Embodiments according to at least one aspect of the techniques and apparatus disclosed herein include methods for generating and transmitting a TDD coordination signal, as well as corresponding methods for receiving and processing such a signal. One example method, as might be implemented in a radio network node such as an LTE eNodeB, includes the generating of a TDD coordination signal and the transmitting of the TDD coordination signal to one or more other radio network nodes. The TDD coordination signal can take any of several forms or include any of a variety of content, as detailed below. In some embodiments, the coordination signal is transmitted in a guard period of a special subframe at the target node. In others, the coordination signal is transmitted in another interval during which the receiving node is not transmitting, such as in uplink subframe for the receiving node, an uplink portion of a special subframe at the receiving node, or in a downlink subframe or downlink portion of a special subframe during which the receiving node is not transmitting. Combinations of these approaches may be used, in some embodiments.

In some embodiments, the TDD coordination signal takes the form of an ePDCCH. In some embodiments, the TDD coordination signal comprises a measurement signal to be measured by the receiving node; the measurement signal could comprise a CSI-RS or SRS, for example. Again, combinations of these approaches may be used, in some embodiments.

In another example method, a radio network node receives TDD coordination signals sent from another node (e.g., a macro node or a potential victim eNodeB), and determines limits on resource scheduling, based on the received signals. In some embodiments, for example, the radio network node listens to another node's reference signal to estimate the path loss to the other node. In some embodiments, the estimated path loss is used to apply a DL power control in certain sub-frames. In some embodiments, the received coordination comprises a request for resources from the other node; in some of these embodiments the radio network node determines one or more resource grants for the other node, based on the request, and transmits the one or more resource grants to the other node.

Embodiments of the techniques detailed herein further include radio network node apparatus adapted to carry out one or more of the methods summarized above and variants thereof. Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 illustrates example uplink-downlink configurations for subframes in a time-division duplexing (TDD) frame.

FIG. 2 illustrates the possible configurations of special subframes in a TDD frame.

FIG. 6 illustrates an example deployment of differing TDD configurations in neighboring cells.

FIG. 7 illustrates an example wireless communication system.

DETAILED DESCRIPTION

Figure 3:
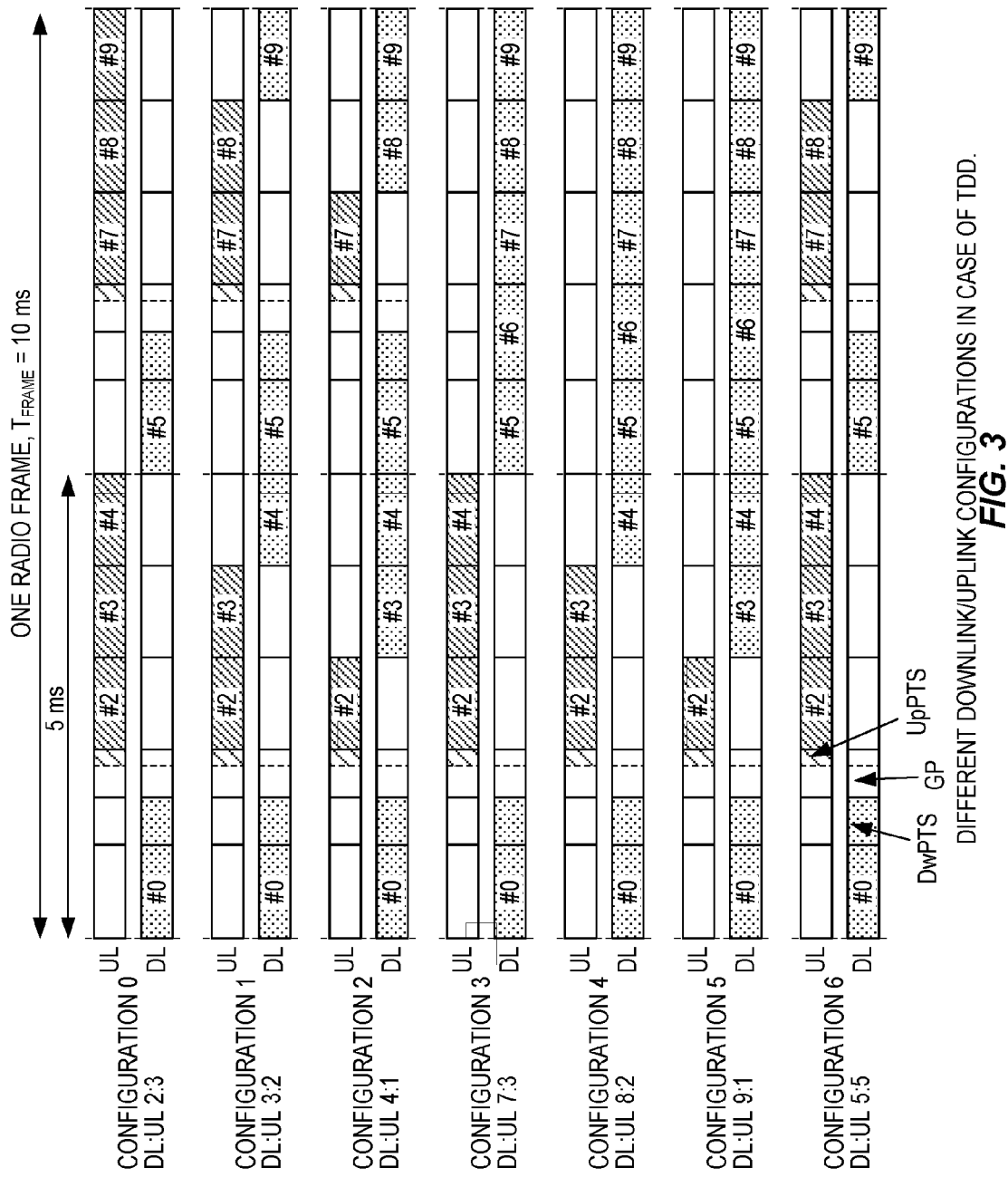
FIG. 3 illustrates the allocation of uplink and downlink resources in the different uplink/downlink frame configurations.
Figure 4:
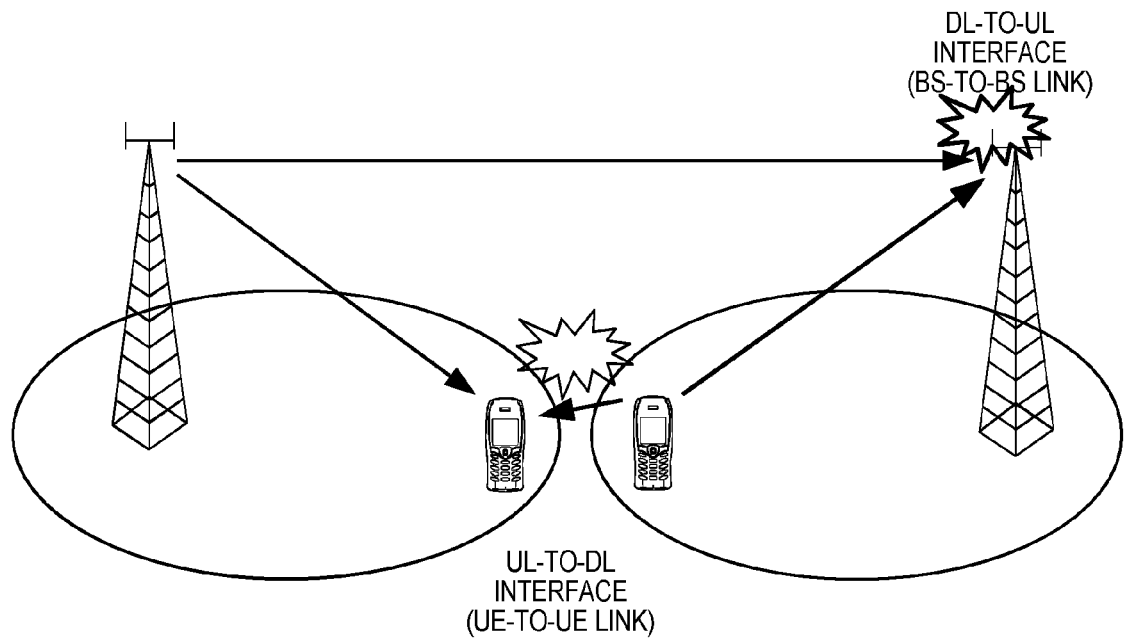
FIG. 4 illustrates a base-station-to-base-station interference scenario.
Figure 5:
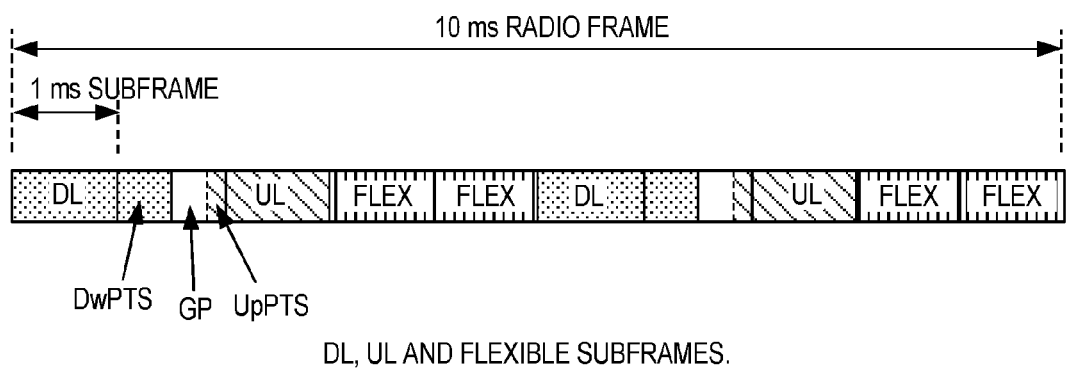
FIG. 5 illustrates an example radio frame comprising downlink, uplink, and flexible subframes.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Referring now to the drawings, FIG. 7 illustrates an exemplary mobile communication network for providing wireless communication services to mobile terminals 100.

Three mobile terminals 100, which are referred to as "user equipment" or "UE" in 3GPP terminology, are shown in FIG. 7. The mobile terminals 100 may comprise, for example, cellular telephones, personal digital assistants, smart phones, laptop computers, handheld computers, or other devices with wireless communication capabilities. It should be noted that the term "mobile terminal," as used herein, refers to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

The mobile communication network comprises a plurality of geographic cell areas or sectors 120. Each geographic cell area or sector 120 is served by a base station 140, which is referred to as an eNodeB in the context of an LTE radio access network, formally known as the Evolved Universal Terrestrial Radio Access Network, or E-UTRAN. One base station 140 may provide service in multiple geographic cell areas or sectors 120. The mobile terminals 100 receive signals from base station 140 on one or more downlink (DL) channels, and transmit signals to the base station 140 on one or more uplink (UL) channels.

In an LTE network, base station 140 is an eNodeB and may be connected to one or more other eNodeBs via an X2 interface (not shown). An eNodeB is also connected to an MME 130 via an S1-MME and to one or more other network nodes, such as a Serving Gateway (not shown).

For illustrative purposes, several embodiments of the present invention will be described in the context of a EUTRAN system. Those skilled in the art will appreciate, however, that several embodiments of the present invention may be more generally applicable to other wireless communication systems.

As was discussed above, an example of different TDD configurations across different cells is shown in FIG. 6. In the illustrated example, TDD Configuration 1 is used in the macro cell (represented by the larger cell tower symbol), while a flexible TDD configuration is used in the pico layer (represented by the smaller cell tower symbol). Note that the flexible subframes are indicated with an "F" in FIG. 6. It should be appreciated that base station-to-base station (BS-to-BS) interference can occur in certain subframes, depending on how the flexible subframes are used. This can have a serious impact on the UL throughput in the victim cell.

In a system with multiple terminals served in different cells at the same time by different base stations, there may be interference between uplink and downlink. If a terminal is transmitting in the UL to one base station in one cell (i.e., the base station is receiving) at the same time that another base station in a neighboring cell is transmitting in the DL to another terminal, then the transmitting base station may interfere with the receiving base station, thus causing BS-to-BS interference. There is also the possibility that a transmitting terminal causes interference to a receiving terminal (UE-to-UE interference). BS-to-BS interference may be especially problematic, due to propagation conditions between base stations as well as the (possibly) higher transmit power. This could be detrimental to the UL of the victim system, i.e., at the receiving base station.

Current systems and solutions for scheduling and assignment of resources in TDD systems do not adequately take into account the potential BS-to-BS interference from the base station of one cell on the base station of another cell, in scenarios where asymmetric or dynamic subframes are used. According to one aspect of the teachings herein, coordination information for controlling BS-to-BS interference is transmitted from one radio network node (e.g., LTE eNodeB) to another, using certain parts of the TDD subframe. Various contents and structures of the coordination information signal are described in detail below, as are ways for multiple radio network nodes to transmit such signals.

Over-the-Air Signaling Method

According to one aspect of the present teachings, a radio network node (e.g., an LTE network node) is configured to transmit a TDD coordination message/signal towards another radio network node (eNodeB) within a specific part of a subframe. In order for the receiving node to detect the message from the transmitting node, the receiving node cannot transmit any DL signals at the same time. Consequently, the TDD coordination message should be transmitted so that the receiving node receives the signal during the GP, or in UpPTS, or in an UL subframe, or in a part of DL subframe or DwPTS where no transmissions are taking place from the receiving node.

Figure 8:
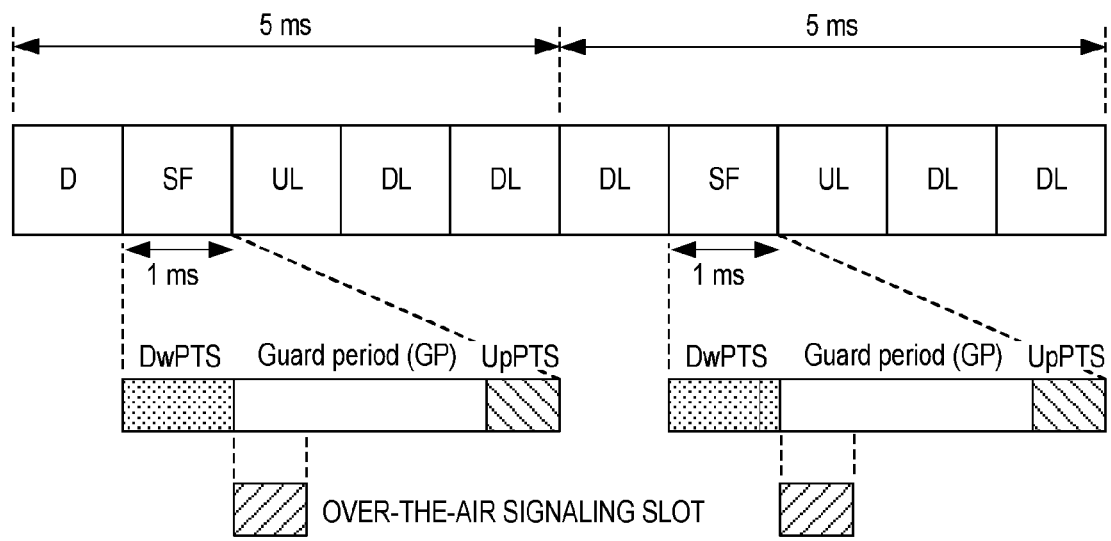
FIG. 8 details possible positions in a special subframe for over-the-air signaling of coordination information between base stations.

An example of such signaling is shown in FIG. 8, which illustrates a frame having an uplink/downlink subframe configuration according to Configuration 2 (see FIG. 3). In this example, the signaling is performed during the GP time, in one or both of the special subframes.

An alternative to utilizing the guard time of a special subframe is to configure a flexible subframe in the interfering or potentially interfering base station (e.g., a pico cell in a heterogeneous network), where the configured flexible subframe corresponds to a downlink subframe in the base station that is the victim of the interference or potential interference. For example, the last subframe in the configuration illustrated in FIG. 6 may be used for this purpose, since this subframe is a downlink subframe at the macro cell and a flexible subframe at the (potentially interfering) pico cell. TDD coordination information can thus be sent by the macro cell to the pico cell in this subframe. Note that some embodiments may use only a portion of the subframe to transmit/receive the TDD coordination information. For example, the pico node may receive coordination information in only the first few symbols of the subframe, leaving the remaining symbols available for downlink transmission.

The Content of the Over-the-Air Signal

The transmitted TDD coordination information transmitted according to the techniques described above may comprise any of a variety of forms and content, in various embodiments of the invention. For example, the coordination information may comprise a resource grant or grants for a specific base station, such as limitations or permissions for the target base station to use particular subframes and/or physical resource blocks (PRBs) for uplink and/or downlink transmissions. Note that the term "resource grant" as used herein should not be confused with the term "uplink grant" as commonly used in LTE document. Here, a "resource grant" refers to a limitation, i.e., a restriction that prevents a base station (e.g., an LTE eNodeB) from transmitting in one or more subframes and/or physical resource blocks or from scheduling transmission in one or more subframes and/or physical resource blocks, or a grant of permission for a base station to use one or more subframes and/or physical resource blocks, rather than an allocation of resources for a mobile terminal's transmission.

Likewise, the coordination information may, in some embodiments, comprise a request for resources, i.e., a request from a base station for permission to use certain resources for uplink and/or downlink transmissions. In some embodiments, both types of coordination information may be used. For example, a request for resources may be transmitted from a pico node or other low power node to a macro node or other higher power node, in some systems. A resource grant, perhaps determined in response to such a request, could be transmitted from a macro node or other node that is or is likely to be the victim of interference to another node, such as a pico cell.

In some embodiments, the coordination information transmitted according to the above-described techniques may comprise a signal that the receiving node can measure for interference coordination purposes, e.g., to determine a path loss between the nodes and/or to estimate interference caused by the transmitting node. It will be appreciated that some embodiments may use this measurement signal, or "beacon" signal, in some subframes while transmitting or receiving other types of TDD coordination information in other subframes.

For example, a pico node adapted according to the present techniques can listen to a measurement signal transmitted by the macro node to estimate the path loss to the macro node, e.g., using techniques similar to a UE's measurements of the Reference Signal Received Power (RSRP) broadcasted by a macro node, which is used to estimate the downlink path loss used for UL Open-Loop power control. Such a pico node can use measurements of the macro node's reference signal to estimate the path loss to the macro and then use the estimated path loss to apply a DL power control in certain sub-frames.

As another example, to get relevant power limitations, an eNodeB adapted according to the present disclosure can listen to a beacon signal transmitted by one or more other nodes, to measure the interference levels caused by that eNodeB or eNodeBs. The eNodeB monitoring the beacon signal(s) can then inform the eNodeB node or nodes of the relative power reduction required, for example, when transmit power limitation is desirable.

The signal transmitted for measurement purposes can, for example, be a specific channel-state-information reference signal (CSI-RS), a sounding reference signal, etc. In various embodiments, this signal can be transmitted by either or both of the interfering or interfered-with nodes.

Signaling via ePDCCH

In some embodiments, the transmitted signal used to deliver TDD coordination information is formed as an enhanced Physical Downlink Control Channel (ePDCCH), which is transmitted on a frequency-limited part of the transmission channel, so that it fits within a window that the receiving node can receive.

Same Carrier or Adjacent Carrier

In many embodiments, the two involved base stations operate on the same carrier. In some embodiments, however, the involved base stations can operate in adjacent carriers.

Over-the-Air Signaling Between Multiple Base Stations

As noted above, either or both of two base stations that need to coordinate may transmit TDD coordination information, in some embodiments. In scenarios where both nodes need to transmit the coordination information, the timing of their respective transmissions may be coordinated, in some embodiments. For example, one node may transmit a TDD coordination signal in the first special subframe of a TDD frame (meaning the special subframe in the first 5 milliseconds of the frame), while the other transmits in the second special subframe (in the second 5 milliseconds of the frame).

In the event of multiple (e.g., more than two) base stations that need to communicate with one another, the transmissions can be arranged in a manner similar to that used for Physical Uplink Control Channel (PUCCH) transmissions, meaning that the multiplexing between different base stations can be done in the same way as PUCCH multiplexing is done.

In some embodiments, a macro node can manage the coordination between multiple base stations by informing pico base stations that need to transmit coordination signals of resources (e.g., PRBs) that are available for that purpose. In this way a macro-assisted resource allocation algorithm can be defined for pico nodes, for use in transmitting the TDD coordination signal.

Figure 9:
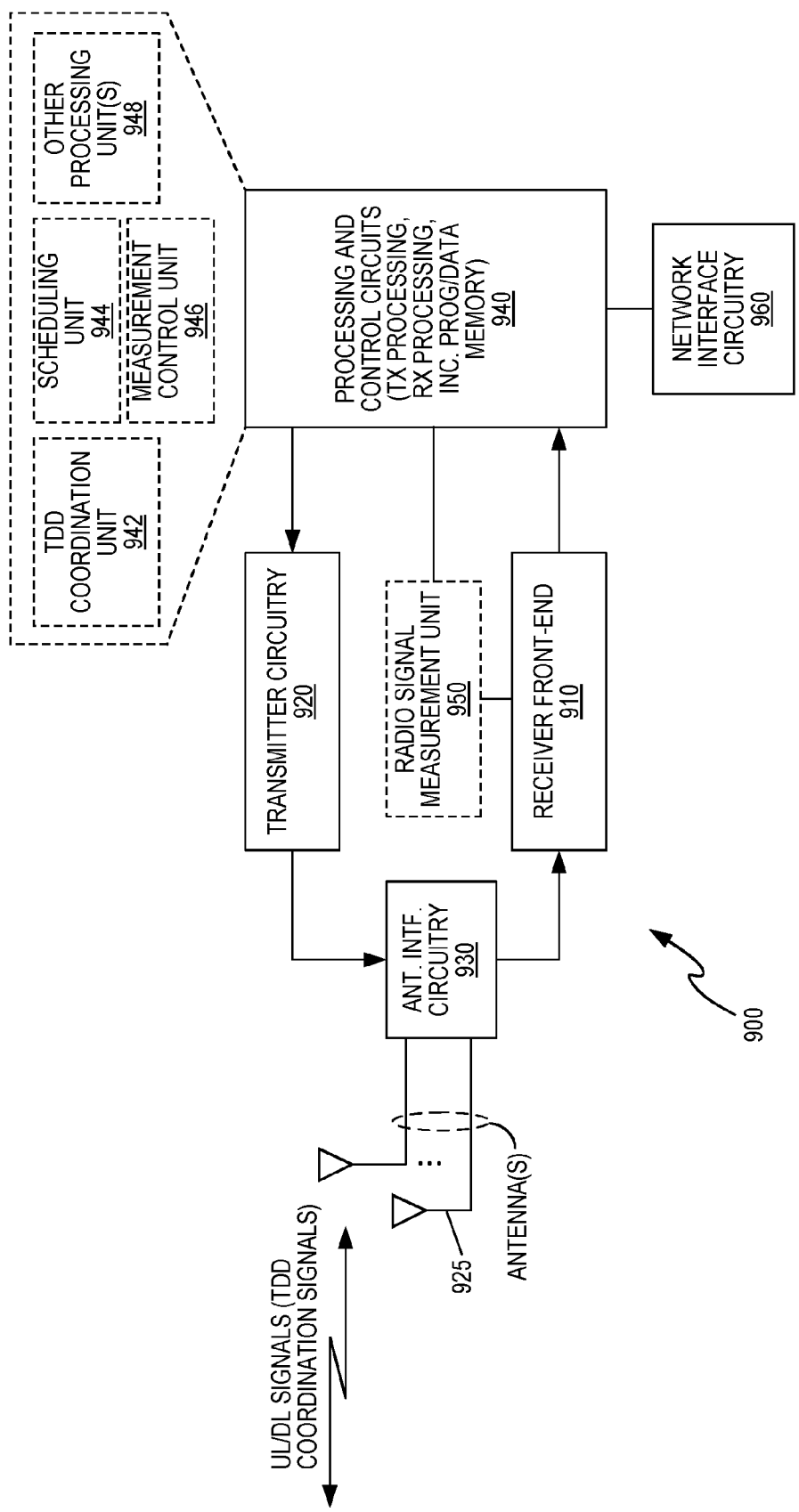
FIG. 9 is a block diagram illustrating components of an example base station.

With the above examples in mind, it will be appreciated that FIG. 9 illustrates one embodiment of a radio network node 900, which may be an eNodeB or other type of base station, relay, access point, etc., configured for operation in a wireless communication network. The illustrated radio network node 900 includes receiver front-end circuitry 910 configured to receive uplink signals from one or more wireless communication devices, e.g., UEs operating in a cell or cells controlled by the node. The radio network node further comprises transmitter circuitry 920 configured to transmit downlink signals to such devices. In one or more embodiments, the transmitter circuitry 920 and receiver front-end circuitry 910 together comprise, e.g., a pool of radio communication resources, such as cellular RF circuitry including transmit and receive signal processing chains. The radio receiver front-end circuitry 910 and transmitter circuitry 920 are coupled to one or more transmit/receive antennas 925, e.g., through antenna interface circuitry 930. The radio receiver 910 and transmitter 920 together function as a transceiver, e.g., a cellular radio transceiver configured for operation in one or more wireless communication networks, such as LTE, WCDMA/HSPA, GSM, etc.

It will be appreciated that the illustrated receiver circuitry 910 includes at least front-end circuitry for processing antenna-received signals (filtering, amplification, down-conversion, digitization), and that the illustrated transmitter circuitry 920 includes at least transmit signal generation circuitry, e.g., power amplifier, etc., for generating a transmit signal for emission via the antenna(s). However, baseband transmit/receive (TX/RX) processing may be performed in the illustrated processing and control circuits 940. These circuits comprise fixed hardware circuits, or programmed hardware circuits, or some combination thereof. In at least one embodiment, the control and processing circuits 940, which may be referred to broadly as the "one or more processing circuits" of the radio network node, comprise one or more microprocessors, microcontrollers, digital signal processors, FPGAs, ASICs, CPLDs, or other digital processing circuit(s), and may further comprise one or more memory devices storing program code (instructions) for execution by one or more of the microprocessors, microcontrollers, etc.

Such circuits may be configured to carry out one or more of the techniques taught herein based on, for example, the execution of a computer program comprising program instructions stored in a memory or other computer-readable medium that is included in or is accessible to the one or more processing circuits of the radio network node. It will be appreciated that such circuitry may comprise one or more physical or at least functional circuits, based on the execution of such program instructions, and the diagram suggests a non-limiting functional circuit arrangement that includes a TDD coordination unit 942, a scheduling unit 944, a measurement control unit 946, and one or more other processing units 948.

These "units" may comprise digital processing circuits realized through the execution of corresponding stored computer program instructions and/or they may comprise fixed circuit arrangements. It will be appreciated that other circuitry is also included in the radio network node, e.g., such as one or more signal strength/quality measurement and determination circuits that are used to perform radio signal measurements. Such a measurement unit 950 is shown explicitly, although it may be integrated into the receiver and at least the signal processing and calculation portions of the measurement unit may be implemented in the one or more processing circuits.

In any case, in some embodiments the radio network node 900 shown in FIG. 9 includes a TDD coordination unit 942 that is configured to generate a TDD coordination signal and control the transmitter circuitry 920 to transmit the TDD coordination signal to one or more other radio network nodes. The TDD coordination signal can take any of the forms or include any of the content discussed above. In some embodiments, the coordination signal is transmitted in a guard period of a special subframe at the target node. In others, the coordination signal is transmitted in another interval during which the radio network node 900 is not transmitting, such as in uplink subframe for the receiving node, an uplink portion of a special subframe at the receiving node, or in a downlink subframe or downlink portion of a special subframe during which the receiving node is not transmitting. Combinations of these approaches may be used, in some embodiments.

In some embodiments, the TDD coordination signal takes the form of an ePDCCH. In some embodiments, the TDD coordination signal comprises a measurement signal to be measured by the receiving node; the measurement signal could comprise a CSI-RS or SRS, for example. Again, combinations of these approaches may be used, in some embodiments.

Other embodiments of the radio network node 900 shown in FIG. 9 include a TDD coordination unit 942 and/or measurement control unit 946 that is/are configured to receive TDD coordination signals sent from another node (e.g., a macro node or a potential victim eNodeB) and to determine limits on resource scheduling, based on the received signals. In some embodiments, for example, the measurement control unit 946 is configured to listen to another node's reference signal to estimate the path loss to the other node, e.g., using techniques similar to a UE's measurements of the Reference Signal Received Power (RSRP) broadcasted by a macro node. The TDD coordination unit 942 can use the estimated path loss to apply a DL power control in certain sub-frames. Measurements according to this approach may be performed on cell-specific reference signals, synchronization signals, position reference signals, channel state information reference signal, or other signals.

In other embodiments, the TDD coordination unit 942 will receive other coordination information, such as resource grants or a request for resource grants, from the TDD coordination signal, and respond accordingly. For instance, the TDD coordination unit 942 may provide scheduling limits to scheduling unit 944, based on the information carried in the TDD coordination signal. Radio network node 900 may be further configured to send and receive configuration information or other information to other network nodes, e.g., other radio network nodes, core network nodes, etc., using network interface circuitry 960.

It will be appreciated that some embodiments of the radio network node 900 illustrated in FIG. 9 may be configured to both receive and process TDD coordination signals from one or more base stations as well as to generate and transmit TDD coordination signals to still other base stations. Accordingly, several of the features described above may be combined in a single radio network node, in some embodiments.

Figure 10:
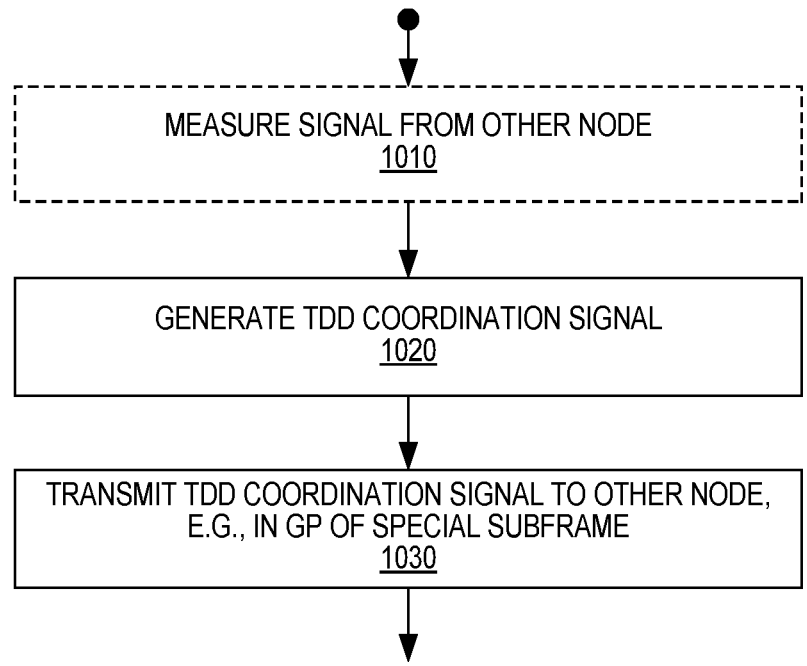
FIGS. 10, 11, 12, and 13 are process flow diagrams illustrating example methods for coordinating network node transmissions in a wireless communication network.

FIG. 10 is a process flow diagram illustrating an example method, implemented in a radio network node, for coordinating network node transmissions. It will be appreciated that the illustrated method, and variants thereof, may be implemented in a radio network node like the one shown in FIG. 9.

As shown at block 1020, the illustrated method includes the generation of a TDD generation signal. This is followed by a transmitting of the TDD coordination signal to the other node, e.g., in the GP of a special subframe, as shown at block 1030. In some embodiments of the method summarized above, the contents and/or format of the TDD coordination signal are determined based on measurements of a signal from the other node, which may also be transmitted in the guard period of a special subframe, for example. The measuring of this signal is shown at block 1010, which is presented with a dashed line to indicate that not all embodiments include this feature.

As discussed earlier, TDD frames in some wireless communication networks may comprise special subframes, the special subframes including a downlink portion, an uplink portion, and a guard period portion. Accordingly, in some embodiments of the method illustrated in FIG. 10, the transmitting of the coordination signal to the second network node may comprise transmitting the coordination signal during the guard period of a special subframe at the second network node. Alternatively, the transmitting of coordination signal to the second network node may comprise transmitting the coordination signal during the uplink portion of a special subframe at the second network node, or during a downlink portion of a special subframe at the second network node in which the second network node is known to be not transmitting. In still another alternative, the coordination signal is transmitted to the second network node during an uplink subframe at the second network node or during a downlink subframe at the second network node during which the second network node is known to be not transmitting. It will be appreciated that some embodiments may employ a combination of these approaches.

In some embodiments, the method shown in FIG. 10 is implemented in a Long-Term Evolution (LTE) network. In some of these embodiments, the coordination signal takes the form of an enhanced physical downlink control channel (ePDCCH).

In some embodiments, the coordination signal comprises one or more resource grants for the second network node, the one or more resource grants including permissions or limitations, or both, for the second network node, with respect to the use of particular resources for uplink transmissions or downlink transmissions, or both. In other embodiments, or at other times, the coordination signal may comprise a request to the second network node for resources. In still other embodiments, or at other times, the coordination signal comprises a measurement signal to be measured by the second network node. In some of these embodiments, the coordination signal comprises a channel-state information reference symbol (CSI-RS) or a sounding reference signal (SRS), or both.

Figure 11:
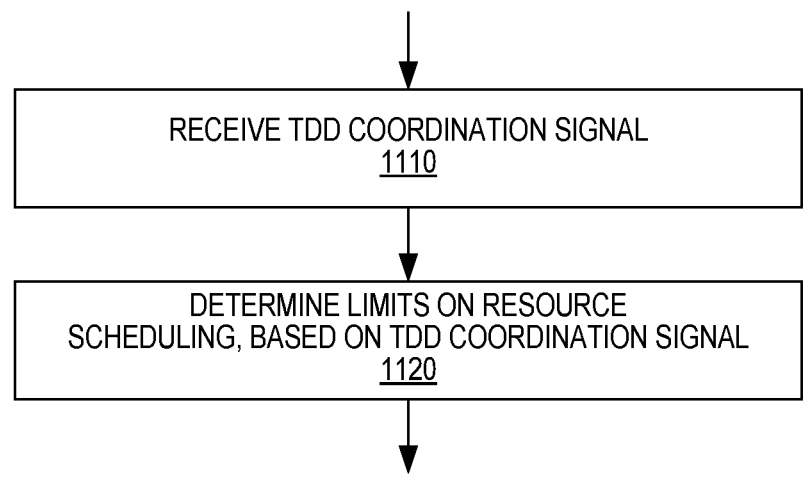

FIG. 11 is a process flow diagram illustrating a complementary method for coordinating network node transmissions in a wireless communication network. As seen at block

1110, this method, which can be viewed as being implemented by the "second network node" discussed above, begins with the receiving, from a first network node, a first coordination signal for use in coordinating TDD transmissions by the first and second network nodes. This coordination signal is received in a wireless time-division duplexing (TDD) subframe, e.g., during the guard period of a special subframe at the second network node, or during the uplink portion of a special subframe at the second network node, or during a downlink portion of a special subframe at the second network node in which the second network node is not transmitting. Alternatively, the coordination signal may be received during an uplink subframe at the second network node or during a downlink subframe at the second network node during which the second network node is not transmitting.

As shown at block 1120, the illustrated method continues with the determining of limits on resource scheduling, based on the received first coordination signal. This determining of limits may take any of several forms. For instance, in some embodiments the first coordination signal may comprise one or more resource grants for the second network node, the one or more resource grants including permissions or limitations, or both, for the second network node, with respect to the use of particular resources for uplink transmissions or downlink transmissions, or both. In these embodiments, the determining of limits on resource scheduling is based on the received resource grants.

Figure 12:
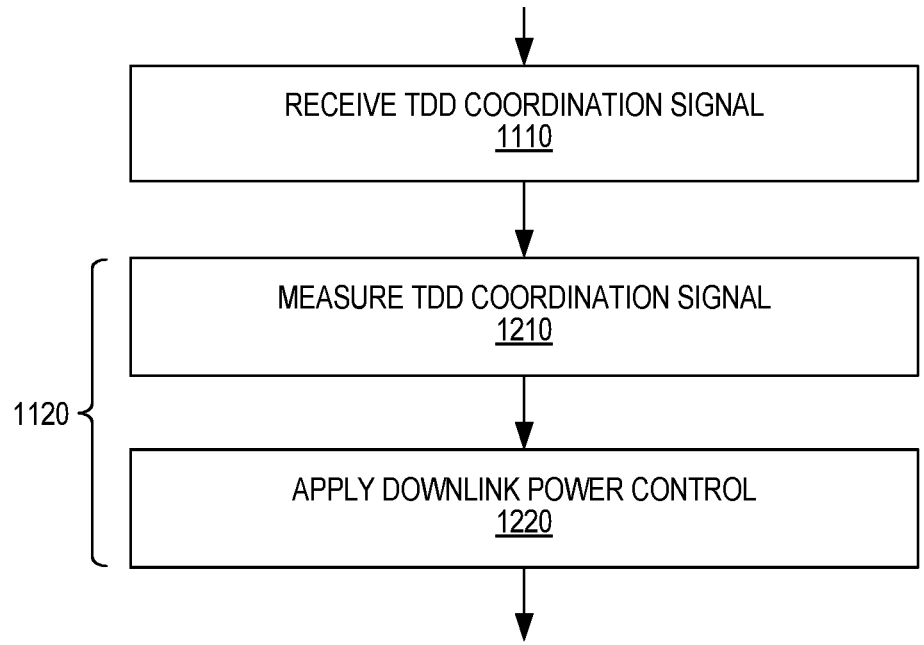

In other embodiments, the first coordination signal comprises a measurement signal to be measured by the second network node, where the limits on resource scheduling are based on the results of such measuring. An example of such an embodiment is shown in FIG. 12, where the determining of limits on resource scheduling comprises the operations shown in blocks 1210 and 1220. As seen at block 1210, the illustrated method includes measuring the TDD coordination signal—this may comprise estimating a path loss between the first and second network nodes, based on the measurement signal, for example. In these embodiments, determining limits on the resource scheduling may comprise applying a downlink power control on one or more subframes, based on the estimated path loss. In other embodiments, a path loss between the first and second network nodes is similarly estimated, based on the measurement signal, but determining limits on resource scheduling comprises informing the first network node of an interference level, based on the estimated path loss, or of a relative power reduction required for transmissions by the first network node, based on the estimated path loss, or both. These techniques may be combined, in some embodiments.

Figure 13:
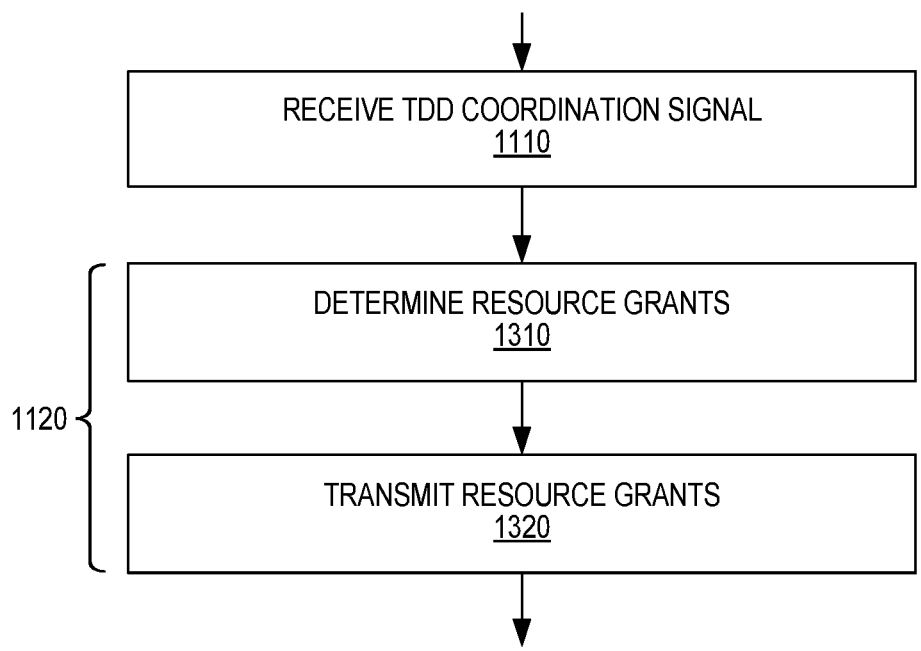

FIG. 13 illustrates another more detailed embodiment of the process illustrated in FIG. 11. In this embodiment, the received TDD coordination signal comprises a request to the second network node for resources. In this case, determining limits on resource scheduling comprises first determining one or more resource grants for the first network node, in response to the request, as shown at block 1310. The one or more resource grants include permissions or limitations, or both, with respect to the use of particular resources by the first network for uplink transmissions or downlink transmissions, or both. The one or more resource grants are then transmitted to the first network node, as shown at block 1320. Once again, the techniques illustrated in FIG. 13 may be combined with any of the other techniques described herein, in various embodiments.

More generally, the methods illustrated in FIGS. 10 and 11 may be implemented in a single network node, in some embodiments. Thus, for example, a first network node may be configured to receive a coordination signal from a second network node for coordinating TDD wireless transmissions by the first and second network nodes, while also being configured to send a coordination signal to a third network node, for coordinating TDD wireless transmissions by the first and third network nodes. Similarly, a first network node may be configured to send a coordination signal of one type to a second network node, while receiving a coordination signal of a second type from the same second network node. For instance, the first network node may send a measurement signal to the second network node, and subsequently receive a coordination signal comprising resource grants for the first network node. In another example, the first network node may send the second network node a coordination signal that comprises a request for resources, and subsequently receive a coordination signal comprising resource grants for the requested resources.

In some embodiments, when coordination signals are exchanged between a pair of network nodes, the incoming and outgoing signals at a given node may be scheduled for the special subframes in the first and second halves of a frame, for example, or vice-versa. Other techniques for scheduling coordination signals among two or more network nodes may be used, including techniques that follow the approach used to schedule PUCCH transmissions in LTE systems, meaning that the multiplexing between different base stations can be done in the same way as PUCCH multiplexing is done. In other embodiments, one macro node can manage the coordination between multiple base stations by informing pico base stations that need to transmit coordination signals of specific resources (e.g., PRBs) that are available for that purpose. In this way, a macro-assisted resource allocation algorithm can be defined for pico nodes, for use in transmitting the TDD coordination signal.

References of further interest with respect to the teachings herein include Erik Eriksson et al., "Dynamic Uplink-Downlink Configurations and Interference Managements in TD-LTE", IEEE Communications Magazine Vol. 50 No. 11, November 2012.

It should be noted that while the present document uses terminology from 3GPP LTE, such usage does not limit the scope of the teachings herein to 3GPP LTE. Other wireless systems, including UTR TDD, WiMax, and UMB (or any other system that runs on dynamic/flexible TDD), inter-RAT E-UTRA TDD may also benefit from exploiting the ideas covered within this document. Further, the term radio network node as used herein can denote essentially any type of network node or network element. Broadly, terminology such as base station or radio network node as used herein should be considering non-limiting, and does not imply a certain hierarchical relation between the two. A "base station" could be considered as serving radio node while other base station(s) are considered as target radio node(s), and these two devices communicate/interfere with each other over certain radio channel.

In some of the description provided herein the more general term "network node" is used. This term should be understood to correspond to any type of radio network node or any network node that communicates with at least a radio network node. Examples of network nodes are any of the radio network node discussed above, as well as core network nodes (e.g. MSC, MME, etc.), operations & maintenance (O&M) nodes, operational support system (OSS) nodes, self-organizing network (SON) nodes, positioning nodes (e.g., E-SMLC), minimization of drive-test (MDT) nodes, etc.

Similarly, the term user equipment (UE) as used herein should also be considered non-limiting, and can refer to any type of wireless communication device that communicates with a radio network node. Examples of user equipment are target device, device-to-device UEs, machine-type UEs (i.e., UEs capable of machine to machine communication), personal data assistants (PDA), wireless-equipped tablet computers, mobile terminals, smart phones, laptop embedded equipped (LEE), laptop mounted equipment (LME), USB dongles or other network communication adaptors or modems, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings. Instead, the present invention is limited only by the following claims and their legal equivalents.

What is claimed is:

1. A method, in a first network node, for coordinating network node transmissions in a wireless communication network, the method comprising:
   generating a coordination signal for use by a second network node in coordinating time-division-duplexing, TDD, wireless transmissions by the first and second network nodes; and
   transmitting the coordination signal to the second network node, in a TDD subframe;
   wherein TDD frames in the wireless communication network comprise special subframes, the special subframes including a downlink portion, an uplink portion, and a guard period portion, and wherein said transmitting the coordination signal to the second network node comprises transmitting the coordination signal during the guard period of a special subframe at the second network node.

2. A method, in a first network node, for coordinating network node transmissions in a wireless communication network, the method comprising:
   generating a coordination signal for use by a second network node in coordinating time-division-duplexing, TDD, wireless transmissions by the first and second network nodes; and
   transmitting the coordination signal to the second network node, in a TDD subframe;
   wherein TDD frames in the wireless communication network comprise special subframes, the special subframes including a downlink portion, an uplink portion, and a guard period portion, and wherein said transmitting the coordination signal to the second network node comprises transmitting the coordination signal during the uplink portion of a special subframe at the second network node or during a downlink portion of a special subframe at the second network node in which the second network node is known to be not transmitting.

3. A method, in a first network node, for coordinating network node transmissions in a wireless communication network, the method comprising:
   generating a coordination signal for use by a second network node in coordinating time-division-duplexing, TDD, wireless transmissions by the first and second network nodes; and
   transmitting the coordination signal to the second network node, in a TDD subframe;
   wherein the coordination signal comprises one or more resource grants for the second network node, the one or more resource grants including permissions or limitations, or both, for the second network node, with respect to the use of particular resources for uplink transmissions or downlink transmissions, or both.

4. A method, in a second network node, for coordinating network node transmissions in a wireless communication network, the method comprising:
   receiving from a first network node, in a wireless time-division duplexing (TDD) subframe, a first coordination signal for use in coordinating TDD transmissions by the first and second network nodes; and
   determining limits on resource scheduling, based on the received first coordination signal;
   wherein TDD frames in the wireless communication network comprise special subframes, the special subframes including a downlink portion, an uplink portion, and a guard period portion, and wherein the first coordination signal is received during the guard period of a special subframe at the second network node, or during the uplink portion of a special subframe at the second network node, or during a downlink portion of a special subframe at the second network node in which the second network node is not transmitting.

5. A method, in a second network node, for coordinating network node transmissions in a wireless communication network, the method comprising:
   receiving from a first network node, in a wireless time-division duplexing (TDD) subframe, a first coordination signal for use in coordinating TDD transmissions by the first and second network nodes; and
   determining limits on resource scheduling, based on the received first coordination signal;
   wherein the first coordination signal comprises a measurement signal to be measured by the second network node, the method further comprising measuring the measurement signal and determining said limits on resource scheduling based on said measuring; and
   wherein the method further comprises estimating a path loss between the first and second network nodes, based on the measurement signal, wherein said determining limits on resource scheduling comprises applying a downlink power control on one or more subframes, based on the estimated path loss.

6. A method, in a second network node, for coordinating network node transmissions in a wireless communication network, the method comprising:
   receiving from a first network node, in a wireless time-division duplexing (TDD) subframe, a first coordination signal for use in coordinating TDD transmissions by the first and second network nodes; and
   determining limits on resource scheduling, based on the received first coordination signal;
   wherein the first coordination signal comprises a measurement signal to be measured by the second network node, the method further comprising measuring the measurement signal and determining said limits on resource scheduling based on said measuring; and wherein the method further comprises estimating a path loss between the first and second network nodes, based on the measurement signal, wherein said determining limits on resource scheduling comprises informing the first network node of an interference level, based on the estimated path loss, or of a relative power reduction required for transmissions by the first network node, based on the estimated path loss, or both.

7. A method, in a second network node, for coordinating network node transmissions in a wireless communication network, the method comprising:
receiving from a first network node, in a wireless time-division duplexing (TDD) subframe, a first coordination signal for use in coordinating TDD transmissions by the first and second network nodes; and
determining limits on resource scheduling, based on the received first coordination signal;
wherein the coordination signal comprises a request to the second network node for resources, and wherein said determining limits on resource scheduling comprises:
determining one or more resource grants for the first network node, the one or more resource grants including permissions or limitations, or both, with respect to the use of particular resources for uplink transmissions or downlink transmissions, or both; and
transmitting the one or more resource grants to the first network node.

8. A radio network node, comprising receiver circuitry and transmitter circuitry configured to receive uplink signals from one or more communication devices and to transmit downlink signals to the one or more communication devices, respectively, and one or more processing circuits that are configured to:
generate a coordination signal for use by a second network node in coordinating time-division-duplexing, TDD, wireless transmissions by the radio network node and the second network node; and
transmit the coordination signal to the second network node in a TDD subframe, using the transmitter circuitry;
wherein TDD frames in the wireless communication network comprise special subframes, the special subframes including a downlink portion, an uplink portion, and a guard period portion, and wherein the one or more processing circuits are configured to transmit the coordination signal during the guard period of a special subframe at the second network node, or during the uplink portion of a special subframe at the second network node, or during a downlink portion of a special subframe at the second network node in which the second network node is known to be not transmitting.

9. A radio network node, comprising receiver circuitry and transmitter circuitry configured to receive uplink signals from one or more communication devices and to transmit downlink signals to the one or more communication devices, respectively, and one or more processing circuits that are configured to:
generate a coordination signal for use by a second network node in coordinating time-division-duplexing, TDD, wireless transmissions by the radio network node and the second network node; and
transmit the coordination signal to the second network node in a TDD subframe, using the transmitter circuitry;
wherein the coordination signal comprises one or more resource grants for the second network node, the one or more resource grants including permissions or limitations, or both, for the second network node, with respect to the use of particular resources for uplink transmissions or downlink transmissions, or both.

10. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and
determine limits on resource scheduling, based on the received first coordination signal;
wherein TDD frames in the wireless communication network comprise special subframes, the special subframes including a downlink portion, an uplink portion, and a guard period portion, and wherein the one or more processing circuits are configured to receive the first coordination signal during the guard period of a special subframe at the radio network node, or during the uplink portion of a special subframe at the radio network node, or during a downlink portion of a special subframe at the radio network node in which the radio network node is not transmitting.

11. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and
determine limits on resource scheduling, based on the received first coordination signal;
wherein the first coordination signal comprises one or more resource grants for the radio network node, the one or more resource grants including permissions or limitations, or both, for the radio network node, with respect to the use of particular resources for uplink transmissions or downlink transmissions, or both, and wherein the one or more processing circuits are configured to determine limits on resource scheduling based on the received resource grants.

12. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and determine limits on resource scheduling, based on the received first coordination signal;
wherein the first coordination signal comprises a measurement signal to be measured by the radio network node, and wherein the one or more processing circuits are configured to measure the measurement signal and determine said limits on resource scheduling based on said measuring; and
wherein the one or more processing circuits are further configured to estimate a path loss between the radio network node and the second network node, based on the measurement signal, and to apply a downlink power control on one or more subframes, based on the estimated path loss.

13. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and
determine limits on resource scheduling, based on the received first coordination signal;
wherein the first coordination signal comprises a measurement signal to be measured by the radio network node, and wherein the one or more processing circuits are configured to measure the measurement signal and determine said limits on resource scheduling based on said measuring; and
wherein the one or more processing circuits are further configured to estimate a path loss between the radio network node and the second network node, based on the measurement signal, and to inform the second network node of an interference level, based on the estimated path loss, or of a relative power reduction required for transmissions by the second network node, based on the estimated path loss, or both.

14. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and
determine limits on resource scheduling, based on the received first coordination signal;
wherein the first coordination signal comprises a request to the radio network node for resources, and wherein the one or more processing circuits are configured to determine limits on resource scheduling by:
determining one or more resource grants for the second network node, the one or more resource grants including permissions or limitations, or both, with respect to the use of particular resources for uplink transmissions or downlink transmissions, or both; and
transmitting the one or more resource grants to the first network node, using the transmitter circuitry.

15. A radio network node, comprising receiver circuitry and transmitter circuitry configured to receive uplink signals from one or more communication devices and to transmit downlink signals to the one or more communication devices, respectively, and one or more processing circuits that are configured to:
receive from a second network node, using the receiver circuitry, a first coordination signal for use in coordinating time-division duplexing, TDD, transmissions by the radio network node and the second network node; and
determine limits on resource scheduling, based on the received first coordination signal;
wherein the one or more processing circuits are further configured to:
generate a second coordination signal for use by the second network node in coordinating TDD wireless transmissions; and
transmit the second coordination signal to the second network node, using the transmitter circuitry; and
wherein the first and second coordination signals are received and transmitted, respectively, in different half-frames of TDD frames.

* * * * *